Patented Sept. 30, 1952

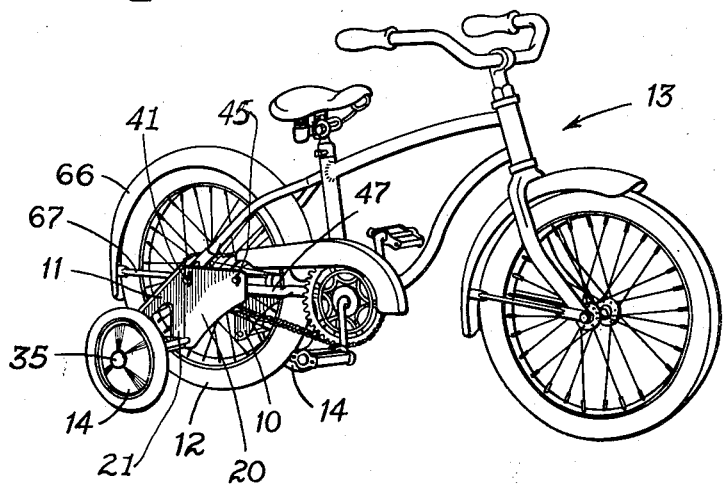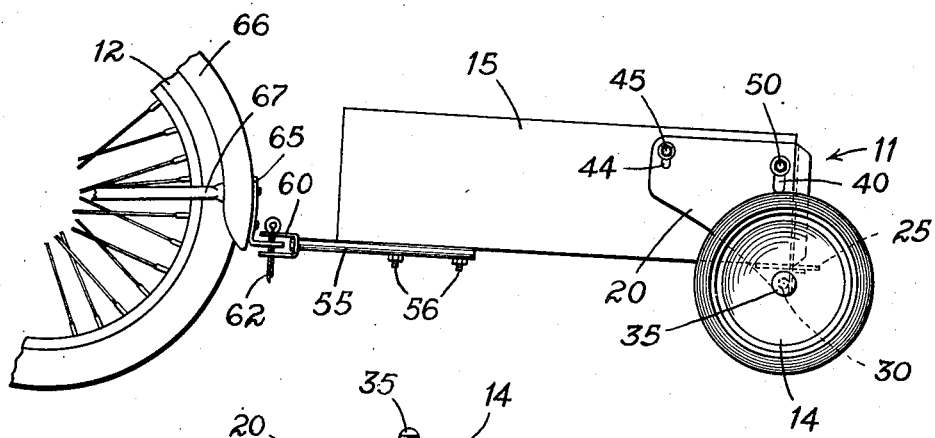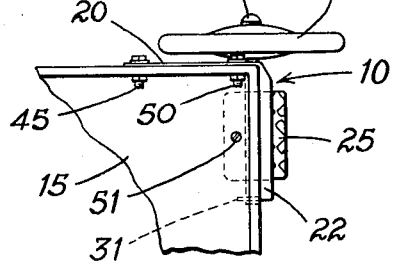

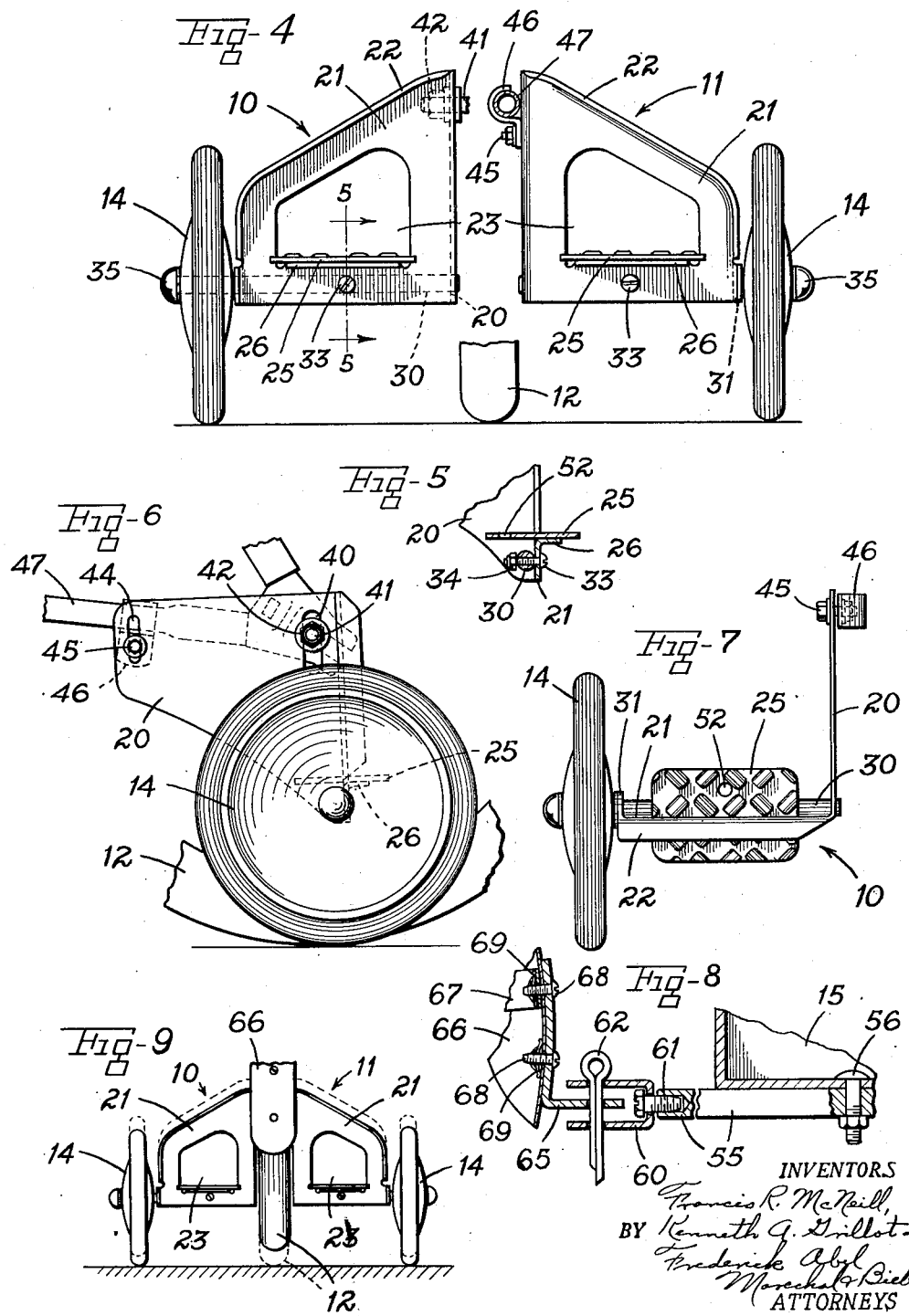

2,612,388

UNITED STATES PATENT OFFICE 2,612,388

WHEELED SUPPORTING DEVICE ATTACHABLE TO BICYCLES OR CONTAINERS

Francis R. McNeill, New Carlisle, Kenneth Alvin Grillot, Spring Valley, and Frederick Abel, Dayton, Ohio, assignors to The Huffman Manufacturing Company, Dayton, Ohio, a corporation of Ohio Application October 21, 1949, Serial No. 122,724

10 Claims. (Cl. 280—295)

This invention relates to a bicycle, and more particularly to an assembly which may be attached to the bicycle for converting it to a multi-wheeled vehicle, and which may also be separately used to form another vehicle for use by the child.

When a child first learns to ride an ordinary two-wheeled bicycle it is necessary that he acquire a proper sense of balance and learn to coordinate his movements with those of the bicycle. To facilitate this training, the invention provides auxiliary wheel assemblies which may be detachably secured to the two-wheeled bicycle for the purpose of converting it into a multi-wheeled vehicle which will be easier for the child to ride during this training period. Also, with the bicycle thus converted it can be more readily ridden in the house, basement, garage or other confined space, and in addition the auxiliary assemblies are of such construction that they may be adjusted to raise the rear wheel of the bicycle above the ground and thus to effect ready conversion into a simple device for exercising, for use by paralytics, or the like.

In the use of the invention for training in riding a bicycle, the auxiliary wheels are first adjusted to support the bicycle against accidental tipping, and then as the child acquires additional skill, the auxiliary wheels may be first partly withdrawn from normal ground contact and later completely removed, restoring the bicycle to its regular two-wheeled construction. In addition, the wheel assemblies are of such construction that they may be readily mounted upon a conventional box or the like, thus forming a novel two-wheeled vehicle construction for additional use by the child, either in the nature of a wheelbarrow or pushcart, or as a trailer adapted to be attached to the bicycle itself and drawn along behind the same.

It is accordingly one of the principal objects of the present invention to provide simple auxiliary wheel assemblies which may be selectively attached to a bicycle for use as an aid to a child learning to ride the bicycle or for converting the bicycle for exercise purposes with the rear wheel elevated above the ground, but which are not limited to these uses and are also adapted for quick conversion to other uses such as to form a vehicle suitable for additional play as well as utilitarian purposes.

Other objects and advantages of the invention will be apparent from the following description, the accompanying drawings and the appended claims.

In the drawings—

Fig. 1 is a perspective view of a bicycle provided with an auxiliary wheel device in accordance with the present invention;

Fig. 2 is a fragmentary side elevational view showing the device secured to a box to form a trailer for the bicycle and also showing a connection between the trailer and the bicycle;

Fig. 3 is a fragmentary plan view of the one corner of the trailer of Fig. 2;

Fig. 4 is a rear end view of the device showing the means for attaching the two brackets or frame members to a bicycle;

Fig. 5 is a fragmentary section on the line 5—5 of Fig. 4;

Fig. 6 is a fragmentary view in side elevation further showing the means for attaching the device to the bicycle;

Fig. 7 is a plan view of the left-hand bracket unit;

Fig. 8 is a fragmentary section on a larger scale showing the connection between the trailer of Fig. 2 and the bicycle; and Fig. 9 is a rear end view further illustrating the operation of the device.

Referring to the drawings, which illustrate a preferred embodiment of the invention, the device includes a pair of frame members or brackets 10 and 11 which are shown in Fig. 1 as mounted respectively on the left and right sides of the rear wheel 12 of a bicycle indicated generally at 13, each bracket carrying a wheel 14 of smaller diameter than wheel 12. Fig. 2 shows the brackets detached from the bicycle and secured to the corners of a wooden box 15 to form a two-wheeled trailer adapted to be drawn by the bicycle.

The brackets 10 and 11 are alike in construction except for being left and right hand members of a pair, and they are shown in detail in Figs. 4-6. Each bracket is formed of sheet metal and includes two main portions or flanges 20 and 21 arranged at substantially right angles to each other. The bracket portion 20 is flat for close fitted engagement with the bicycle frame, and the portion 21 is provided with a rolled edge 22 for stiffness. In addition, the bracket portion 21 is cut out at 23 for lightness and also to provide a space large enough for a child's foot but preferably too narrow to permit entry of the foot of an adult. The opening however is of sufficient height so as to allow clearance for the instep of the child's foot. A step 25 is mounted within the space 23, the step 25 being shown as a plate fastened to an overturned flange 26 along the lower edge of the space 23, and the plate 25 is provided with a tread surface to prevent slipping. The plate is so mounted that when the auxiliary wheels are in use, the step is pitched forward which facilitates the balance of an extra passenger riding on the step. When the wheels are raised while learning to ride as a two-wheeled bicycle, the step is pitched to the rear to discourage use by an extra passenger.

Each wheel 14 is carried by suitable bearings on a shaft 30 mounted in receiving holes in the bracket portion 20 and in a flanged ear portion 31 adjacent the outer end of bracket 21 below the level of step 25. The shaft 30 is drilled to receive a screw 33 (Fig. 5) extending through the mid-point of bracket portion 21 held by nut 34 to secure the shaft to the bracket. The wheel 14 is held between the outer end of the bracket and the outer end of the shaft 30 by means of an enlarged head 35 on the shaft.

In order to mount the brackets on the bicycle, each bracket portion 20 is provided with a slotted opening 40 adapted to receive the end of the axle 41 of the rear bicycle wheel 12, this mounting operation requiring merely removal and replacement of the standard nuts 42 on axle 41. In addition, the forward end of each bracket portion 20 has a slot 44 which receives a bolt 45 carrying a clip 46 adapted to fit over the conventional tubular portion 47 of the bicycle frame.

This arrangement for mounting the bracket on the bicycle frame is simple and provides for quick and easy assembling of the device on the bicycle. In addition, this slotted arrangement makes possible different adjusted positions of the wheels 14 with respect to the rear wheel 12 of the bicycle. For example, the brackets 10 and 11 can be adjusted downwardly in such manner that when the wheels 14 are in contact with the ground or floor, the wheel 12 will be raised above ground level. This adjusted position of the device makes it possible then to use the bicycle for exercise purposes while it remains essentially stationary, and it is shown in full lines in Fig. 9. It is also possible by adjustment of the slots to raise the brackets sufficiently to lift the wheels 14 above the ground level as indicated in dotted lines, in Fig. 9, a position of adjustment which is desirable when the child is learning to ride on only two wheels, since it provides that only the main wheels of the bicycle are in contact with the road when the bicycle is upright while still retaining the auxiliary wheels in position to prevent the bicycle from overturning when it tips.

Figs. 2, 3 and 8 illustrate the use of the device to convert a box 15 or similar container of wood, sheet metal or the like into a trailer for the bicycle. In order to construct this trailer, the brackets 10 and 11 are first removed from the bicycle, and also the wheels 14 are temporarily dismounted from the brackets by removing the screws 33 and withdrawing the shafts 30 from the brackets. Each bracket is reversed and reassembled on the wheel and axle so that the flange 20 is adjacent the wheel (Fig. 3) instead of remote therefrom as in Fig. 7. The brackets are then secured to the box so that the bracket at the left side of the bicycle is placed at the right rear corner of box 15. It will also be noted that the corner of the box fits into the right angle formed by the bracket portions 20 and 21 in such manner that the underside of the box rests on the step 25. The brackets are readily secured to the box by boring suitable holes to receive the bolts 45 and additional bolts 50 inserted into slots 40; the bottom of the box may be drilled to receive a bolt 51 set in the hole 52 in the step 25.

It will be seen that with the brackets thus mounted on the box, the latter may be readily provided with suitable handles to convert it into a pushcart, wheelbarrow, etc., and Figs. 2 and 8 show a simple draw bar attachment which forms a trailer hitch to the bicycle. The bar or rod 55 is secured to the under side of box 15 by means of a pair of nuts and bolts 56. A clevis 60 is secured to the forward end of bar 55 by a screw 61, and the clevis is adapted for releasable attachment by means of a pin 62 to an L-shaped bracket 65 bolted to the rear fender 66 of the bicycle adjacent the fender brace 67 by means of a pair of self-tapping screws 68 provided with sheet metal spring nuts 69.

This trailer hitch arrangement is simple and readily handled by even a small child, and the part carried by the bicycle being light and unobtrusive when the trailer is detached does not affect the use of the bicycle. The hole in clevis 60 for screw 61 is made sufficiently large to permit free rotation of the clevis on the screw, as shown in Fig. 8, the connection provides an effective universal joint preventing overturning of the trailer even if the bicycle should overturn as well as permitting the bicycle to be laid on one side without tipping the trailer. There is sufficient clearance between the head of screw 61 and end of bar 55 with the oversize hole in clevis 60 as described to give ample freedom of vertical movement of the clevis to permit the trailer to negotiate obstructions, such as curbs, without placing any strain on the trailer, the hitch or the bicycle.

It will accordingly be seen that the invention provides an auxiliary wheel device for a child's bicycle which is not only of material assistance when the child is first learning to ride a two-wheeler, but also offers many possibilities for further use after the child has learned to manage the bicycle without it. When the device is mounted on the bicycle, it supports the child safely and securely while he is getting accustomed to the bicycle, and also provides a safety support when adjusted to the raised position shown in Fig. 9 while the child is learning to ride on only two wheels. It should also be noted that with the device mounted as shown in Fig. 1, the child can readily and safely carry a playmate as a passenger by utilizing the step portions 25, it being merely necessary for the passenger to stand on both steps 25 and hold onto the rider's shoulders or to the saddle of the bicycle. Then after it has been removed from the bicycle, the device is particularly adaptable for forming a trailer as described, which is highly useful as a carrier with the bicycle when the child is doing errands, delivering papers or the like, and the device is not limited to such subsequent uses in conjunction with the bicycle but can be employed to form a push cart or similar carrier for many different purposes.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus of the character described adapted for selective use in conjunction with a bicycle to provide auxiliary wheels for the bicycle and alternatively in combination with a rectangular container to form a separate wheeled vehicle, comprising a pair of frame members each including two portions disposed at substantially right angles to each other, a wheel for each of said frame members, one of said angularly disposed portions of each of said frame members having a plurality of spaced apertures therein, one of said apertures being adapted to receive the axle of the rear wheel of said bicycle to support said frame member on said bicycle, means cooperating with the other of said apertures to secure said frame member to the bicycle at a position spaced from said axle, means on each said frame member for supporting one of said wheels in either of two alternative positions located at opposite ends of the other of said frame portions, one of each of said pairs of apertures being a slot providing for adjustment of said frame members to raise and lower the wheels thereon with respect to the rear wheel of the bicycle, and said frame portions defining a right angled corner adapted in said alternative use of said apparatus to receive a corner of said container with said frame portions overlying the side portions of said container adjacent said corner to locate said apertures in position to receive bolts for securing said frame members to said container.

2. Apparatus of the character described adapted for selective use in conjunction with a bicycle to provide auxiliary wheels for the bicycle and alternatively in combination with a rectangular container to form a separate wheeled vehicle, comprising a pair of frame members each including two portions disposed at substantially right angles to each other, one of said frame portions having a plurality of spaced apertures therein, one of said apertures being adapted to receive the axle of the rear wheel of said bicycle to support said frame member on said bicycle, means cooperating with the other of said apertures to secure said frame member to the bicycle at a position spaced from said axle, said angularly disposed frame portions defining a right angled corner adapted in said alternative use of said apparatus to receive a corner of said container with said frame portions overlying the side portions of said container adjacent said corner to locate said apertures in positions to receive bolts for securing said frame members to said container, a wheel for each of said frame members, and means for selectively mounting said wheels at the outer ends of said frame members, and means for selectively mounting said wheels at the outer ends of said frame members in position to support the bicycle against tilting when said frame members are secured to said bicycle and for mounting said wheels at the opposite ends of said frame members to convert said container into a wheeled vehicle when said frame members are secured to said container.

3. Apparatus of the character described adapted for selective use in conjunction with a bicycle to provide auxiliary wheels for the bicycle and alternatively in combination with a rectangular container to form a separate wheeled vehicle, comprising a pair of frame members each including two portions disposed at substantially right angles to each other to engage a corner of said container in said alternative use of said apparatus, means for securing one of said portions of each said frame member to said bicycle with the other said portion extending laterally outwardly with respect to said bicycle, a wheel for each said frame member, a shaft for each said wheel, and means for mounting said shaft in the associated said frame member with said wheel adjacent one end of said laterally extending frame portion in said alternative use of said frame member in said use of said container and with said wheel adjacent the opposite end of said laterally extending frame portion when said frame member is mounted on said bicycle.

4. Apparatus of the character described for providing auxiliary wheels for a bicycle comprising a pair of frame members each including two portions disposed at substantially right angles to each other, a wheel for each of said frame members, means for supporting said wheels on said frame members, one of said angularly disposed portions of each of said frame members having a slotted aperture therethrough adapted to receive the axle of the rear wheel of said bicycle to support said frame member on said bicycle, each of said apertured frame portions having an additional aperture therein spaced forwardly of said slotted aperture, means cooperating with each of said additional apertures to secure said frame members to the bicycle at a position spaced from said axle, and said slotted apertures being generally vertically arranged to provide for adjustment of said frame members to raise and lower said wheels thereon with respect to the rear wheel of the bicycle.

5. Apparatus of the character described for providing auxiliary wheels for a bicycle comprising a pair of brackets each including two frame portions disposed at substantially right angles to each other, a wheel for each of said brackets, means for supporting said wheels on said brackets, one of said angularly disposed portions of each of said brackets having a slotted aperture therethrough adapted to receive the axle of the rear wheel of said bicycle to support said bracket on said bicycle, the other said bracket portions each including a part forming a step, means on each said apertured frame portion spaced forwardly of said slotted aperture therein for securing said brackets to the horizontal frame of the bicycle at positions spaced forwardly from said axle, said slotted apertures being generally vertically arranged to provide for adjustment of said brackets to raise and lower said wheels thereon with respect to the rear wheel of the bicycle, a rigid reinforcing member for each of said brackets, and means connecting each said rigid member to each of said bracket portions above the step on said other bracket portion to stiffen said bracket while leaving a space above said step for receiving the foot of a passenger.

6. An auxiliary wheel attachment of the character described for a bicycle comprising a pair of brackets adapted to be operatively positioned on opposite sides of the rear wheel of a bicycle, each said bracket including a portion adapted in said operative position to lie in a generally vertical plane substantially parallel with said wheel and the bicycle frame, each said bracket portion having an aperture therethrough for receiving the axle of said bicycle wheel, means forming a clamp on each said bracket portion spaced forwardly of said aperture therein for securing said bracket to a horizontal frame member of said bicycle at a position spaced forwardly from said axle, each said bracket also including a lateral portion extending substantially at right angles from the lower end of said apertured portion, a wheel and axle for each of said brackets, means supporting said wheels and axles on said lateral portions of said brackets, and a rigid brace connecting the upper end of each said apertured bracket portion with the outer end of the associated said lateral portion to maintain said portions of said bracket in rigidly braced relationship.

7. An auxiliary wheel attachment of the character described for a bicycle comprising a bracket including two frame portions disposed at substantially right angles to each other, a wheel and axle on said bracket, means on one said frame portion of said bracket for mounting said bracket on said bicycle, means on the other said frame portion of said bracket for fixedly supporting said axle, said wheel being in laterally spaced and parallel relation with said one frame portion and the rear wheel of said bicycle, means on said bracket forming a brace connecting the upper end of said one frame portion thereof with the outer end of the other said frame portion, said brace including a portion extending above in spaced relation with said other frame portion to provide an opening therebetween for receiving the foot of a passenger, and means on said other frame portion below said opening forming a step for receiving said foot of said passenger.

8. Apparatus of the character described adapted for selective use in conjunction with a bicycle to provide auxiliary wheels for the bicycle and alternatively in combination with a rectangled container to form a separate wheeled vehicle, comprising a pair of brackets each including two frame portions disposed at substantially right angles to each other, said frame portions being arranged to extend on generally vertical planes in normal use to present one thereof in generally parallel relation with said bicycle for attachment thereto and alternatively to present both of said frame portions in respectively parallel relation with adjacent sides of said container for receiving a corner of said container, a wheel for each of said brackets, means on each said bracket for supporting said wheel in either of two alternative positions generally parallel with said one frame portion and located at opposite ends of the other said frame portion, and means on one said frame portion of each said bracket for securing said bracket alternatively to said bicycle and to said container.

9. Apparatus of the character described adapted for selective use in conjunction with a bicycle to provide auxiliary wheels for the bicycle and alternatively in combination with a rectangled container to form a separate wheeled vehicle, comprising a pair of brackets each including a flange adapted to extend in a generally vertical plane in substantially parallel relation with the rear wheel of said bicycle and alternatively to extend in substantially parallel and overlying relation with the side portion of said container adjacent one corner thereof, said bracket also including a portion arranged at substantially right angles to said flange thereon, means on said bracket portion forming a generally horizontal step for supporting the foot of a passenger in the mounted position of said bracket on said bicycle, said step being proportioned to extend beneath and in supporting relation with the bottom of said container in the attached position of said bracket on said container, means on said flange for securing said bracket alternatively to said bicycle and to said container, a wheel for each of said brackets, and means on each said bracket for supporting said wheel in either of two alternative positions generally parallel with said flange and located respectively at the opposite end of said bracket portion from said flange for use on said bicycle and adjacent said flange for use on said container.

10. A stabilizer for a bicycle comprising a bracket including a vertical plate wall, a plate wall extending horizontally from adjacent the lower part of said vertical wall, said vertical wall being formed with a slot to receive the rear axle of the bicycle, means on said vertical wall for engaging a horizontal frame member of the bicycle whereby the bracket may be positioned vertically of the bicycle frame, an integral brace comprising a member having a portion interconnected with said vertical wall, another portion thereof being interconnected with said horizontal wall, said brace having an intermediate portion spaced above said horizontal wall, a stub axle mounted in fixed position on said stabilizer below said horizontal wall and extending outwardly thereof, and a single wheel mounted on said axle.

FRANCIS R. McNEILL.
KENNETH ALVIN GRILLOT.
FREDERICK ABEL.

REFERENCES CITED

The following references are of record in the file of this patent:

UNITED STATES PATENTS

| Number | Name | Date |
|---|---|---|
| 661,145 | Hausmann | Nov. 6, 1900 |
| 1,044,232 | O'Brien | Nov. 12, 1912 |
| 2,391,982 | Kutil | Jan. 1, 1946 |
| 2,450,979 | Moller | Oct. 12, 1948 |
| 2,462,769 | Pedersen | Feb. 22, 1949 |
| 2,527,431 | Kutil | Oct. 24, 1950 |

FOREIGN PATENTS

| Number | Country | Date |
|---|---|---|
| 689,864 | France | June 3, 1930 |
| 770,123 | France | June 25, 1934 |
| 869,576 | France | Nov. 17, 1941 |